June 6, 1961     J. P. URBON     2,987,093
MULTIPLE CHAMBERED TIRE
Filed July 22, 1957     3 Sheets-Sheet 1
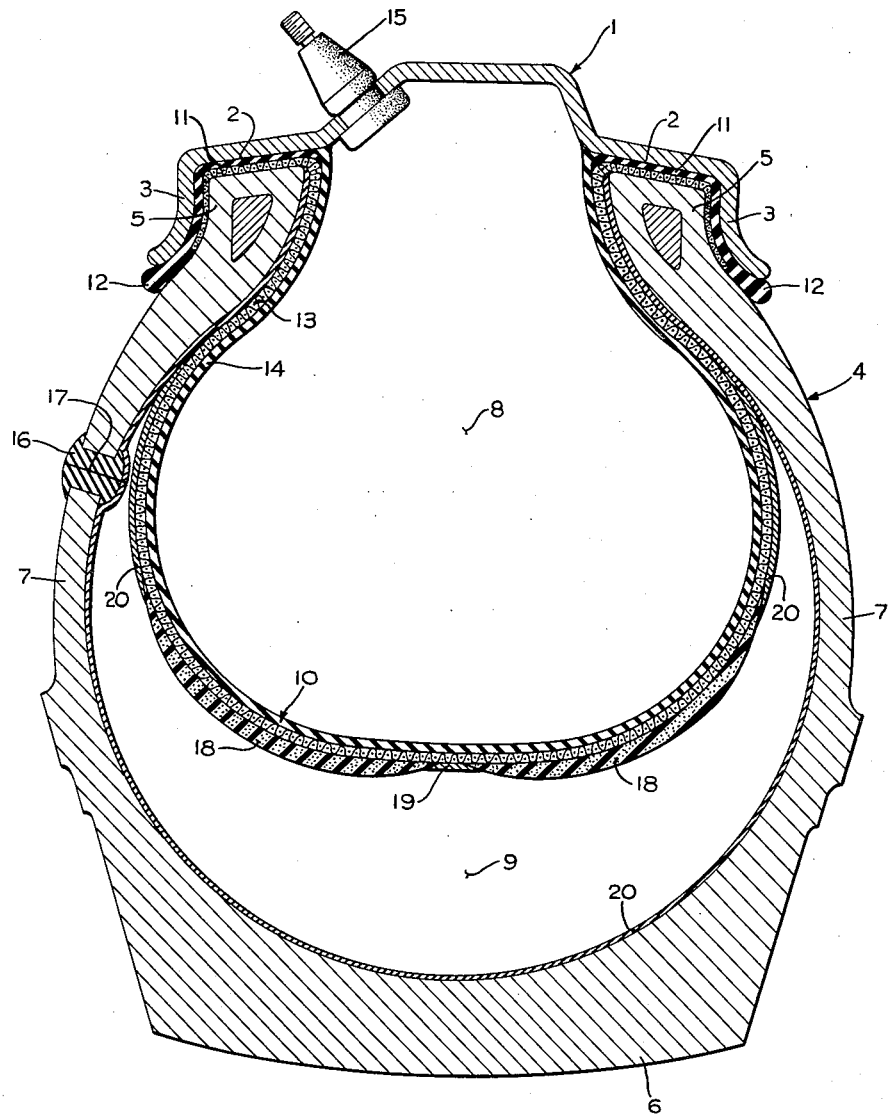
FIG. I
INVENTOR.
JOHN P. URBON
BY
*R. L. Miller*
ATTORNEY June 6, 1961 J. P. URBON 2,987,093
MULTIPLE CHAMBERED TIRE
Filed July 22, 1957 3 Sheets-Sheet 2
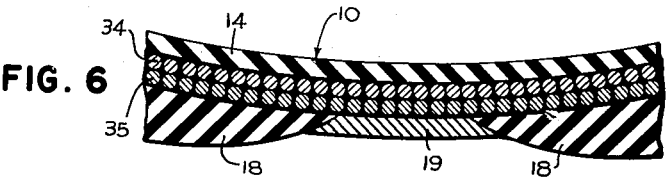
FIG. 6
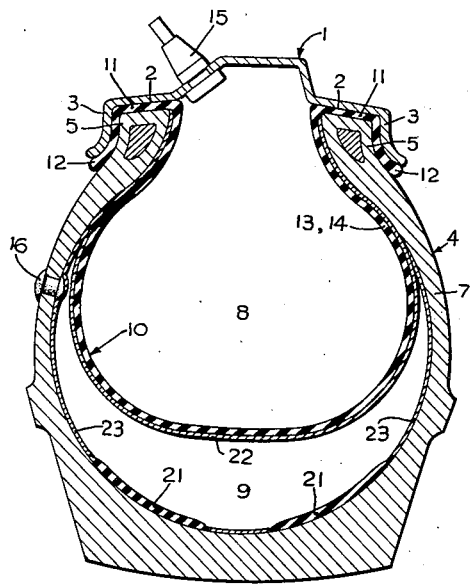
FIG. 3
FIG. 2
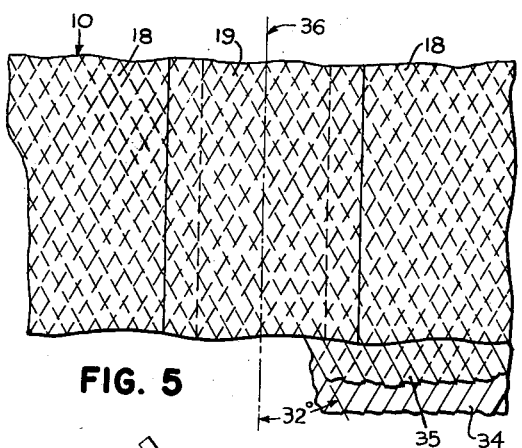
FIG. 5
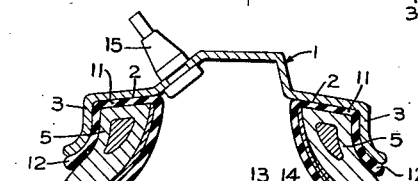
FIG. 4
INVENTOR.
JOHN P. URBON
BY
R. L. Miller
ATTORNEY June 6, 1961   J. P. URBON   2,987,093
MULTIPLE CHAMBERED TIRE Filed July 22, 1957   3 Sheets-Sheet 3

INVENTOR.
JOHN P. URBON
BY
R. L. Miller
ATTORNEY

United States Patent Office 2,987,093
Patented June 6, 1961

2,987,093
MULTIPLE CHAMBERED TIRE
John P. Urbon, Cuyahoga Falls, Ohio, assignor to The Goodyear Tire & Rubber Company, Akron, Ohio, a corporation of Ohio
Filed July 22, 1957, Ser. No. 673,407
18 Claims. (Cl. 152—340)

The present invention relates to a multiple-chambered tubeless tire and rim combination in which the air-retaining compartment, formed by an open-bellied tubeless tire and rim, is divided into two air chambers, an inner chamber adjacent the rim and an outer chamber disposed radially outwardly thereof adjacent the inner tread surface of the tire. In the preferred form of the invention the inner chamber is formed by an omega shaped diaphragm having the lateral edges thereof separably mounted between the beads of the tire and the adjacent bead seats and flanges on the rim. When the outer chamber is deflated as in the case of a blowout or puncture, the inner chamebr remains inflated to permit continued operation of the vehicle for a considerable distance. Thus, if a puncture or blowout occurs on a crowded highway, in a tunnel or at some other place where it is inconvenient or undesirable to stop and make a repair, it is possible to drive the vehicle for a considerable distance without danger of destroying the inner chamber or the tire. Usually, it is not necessary to provide for such operation for a distance of over 100 miles as a sensible driver will stop at the first service station or convenient spot to make the repair or have the repair made for him. However, in service tests such tires have been operated for distances materially in excess of 200 miles after complete deflation of the outer chamber.

In order to permit such long continued operation without failure of the inner chamber it is the purpose of the invention to provide a lubricant between the tire and diaphragm so that when the outer chamber is deflated and the diaphragm rides on the inner tread surface of the tire, friction will be minimized and wear on the tire and chamber will be substantially negligible. In the application of Sanderson and Eberhard, Serial Number 589,247, filed June 4, 1956, one means of lubrication is described and claimed. This consists of applying a fluid lubricant to the outer wall of the inner chamber or to the inner tread surface of the tire. This means of applying the lubricant has certain drawbacks. For example, in mounting the diaphragm forming the inner chamber on the beads of the tire some of the lubricant may come in contact with the beads resulting in lubrication of these surfaces. Obviously, since it is desired that the beads hold the diaphragm in place the beads should not be lubricated. Therefore, it is a purpose of this invention to provide a more satisfactory method of lubrication than disclosed in said application.

One object of this invention is to provide an improved lubricated surface for reducing the friction betwen the inner chamber and the tire when the inner chamber becomes deflated. This is accomplished by means of a rubber or rubber-like material incorporating a lubricant physically embedded in the rubber or rubber-like material. For convenience the term "rubber" includes not only natural rubber but also synthetic rubber or equivalents. This lubricated rubber is then applied to either the outer surface of the diaphragm forming the inner chamber or to the inner tread surface of the tire. This not only insures a controlled distribution of the lubricant, but since the lubricant is held within the rubber, there is little likelihood that the lubricant will be transferred to the beads of the tire when mounting the diaphragm on the tire before the tire and diaphragm are mounted on the rim.

Specifically, an object of this invention is to provide either a solid or fluid lubricant or both physically embedded in a layer of rubber which is then applied to one or both of the opposed surfaces of the diaphragm and tire. In addition, an object of this invention is to incorporate this lubricant in the rubber in the unvulcanized state and to apply it in its tacky unvulcanized state to the tire or diaphragm during the building operatioin. By so doing the rubber itself will adhere to the layers of rubberized fabric from which the inner chamber is formed. This layer of lubricated rubber could, of course, be vulcanized or semi-vulcanized before application but this would require the use of cements or the like to cause adhesion of the layer of rubber to the diaphragm or tire.

Another object of this invention is to use a solid or liquid lubricant either singly or in combination and physically mx the lubricant with the uncured rubber-like material in a Banbury mixer, warm-up mill or the like.

Another object of this invention is to provide the lubricant in selected amounts in the areas where the lubricant will do the most good. Several embodiments of the invention are shown in the drawings. If the shape of the inner chamber or tire is changed, a different distribution of the lubricant may be desirable. However, basically the lubricant should be applied to those surfaces which are subject to the most abrasive action during operation of the tire after deflation and collapse of the outer chamber.

Other objects of this invention will appear hereinafter as the description of the invention proceeds, the novel features, arrangements and combinations being clearly set forth in the claims hereunto appended.

In the drawings:

FIG. 1 is a cross-section through an annular safety tire and rim construction embodying my invention;

FIG. 2 is a view similar to FIG. 1 showing the outer chamber completely deflated as in the case of a blowout or puncture;

FIG. 3 is a view similar to FIG. 1 showing another form of the invention;

FIG. 4 is a view similar to FIG. 1 showing a further modification;

FIG. 5 is a fragmentary view illustrating the arrangement of the cords in the diaphragm.

FIG. 6 is an enlarged cross-section through the outer wall of the diaphragm showing details of construction not fully illustrated in FIG. 1;

Throughout the drawings the same reference numerals indicate the same or similar parts.

Figure 7:
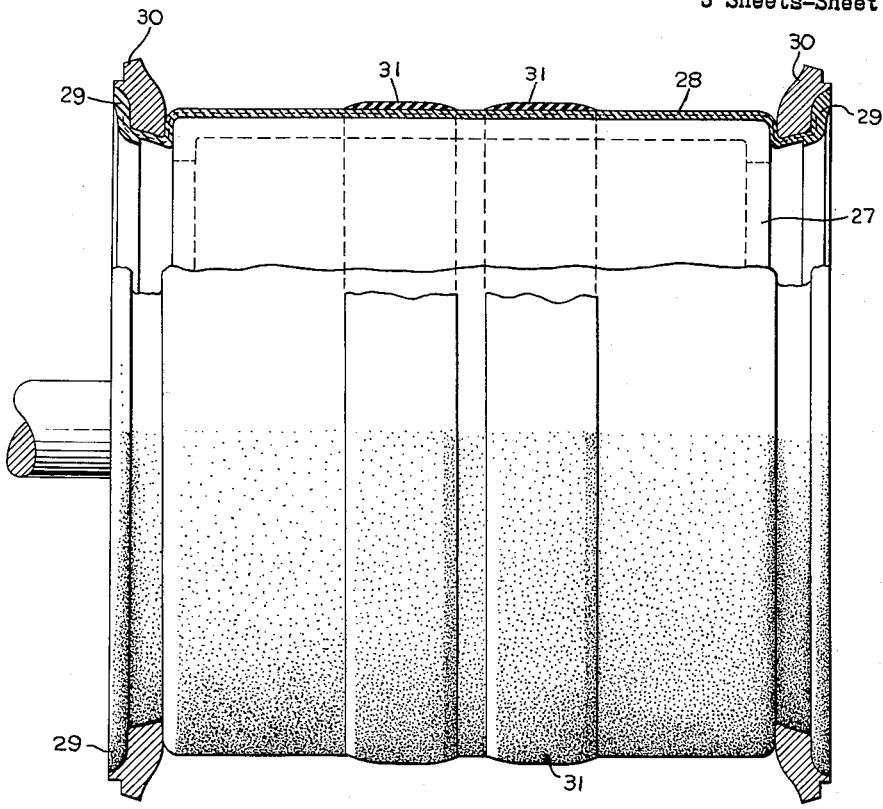
FIG. 7 is a schematic view showing the manner in which the lubricated strips are applied to the diaphragm during manufacture.

In FIG. 1 the rim 1 is provided with bead-receiving seats 2 and side flanges 3. A tire 4 of the open-bellied tubeless type is provided with tire beads 5 which are normally mounted on the seats 2 of the rim. The tire also comprises the tread portion 6 and sidewalls 7. When mounted on the rim the tire forms therewith an annular air container therewith. In the present invention this container is divided into an inner chamber 8 and an outer chamber 9 by an omega-shaped diaphragm 10.

The diaphragm 10 has lateral extensions 11 thereon extending under the beads 5 and then upwardly between the rim flanges 3 and the beads 5, the extensions terminating in enlarged portions 12 to assist in preventing the extensions from being pulled out from between the beads and rim. The body of the diaphragm is formed of one or more layers of fabric cords or reinforcing fabric to prevent expansion of the inner chamber to a size that it will completely fill the tire 4 when the outer chamber becomes deflated. Preferably, two layers of fabric are used with the cords running at opposite angles to each other and with the ends extending entirely across the diaphragm and into both of the extensions. In FIG. 1 of the drawings a single layer of fabric 13 is illustrated, merely for simplicity, but in FIGS. 2 and 3 the preferred construction embodying two layers is illustrated and will be described later. The inner surface of the diaphragm is provided with a relatively thin layer of rubber 14 sufficient to make the diaphragm substantially air impervious, so that upon deflation of the outer chamber the air will be retained within the inner chamber for a considerable period of time. 100% imperviousness is desirable but not imperative as a small diffusion rate is permissible and with known materials it is difficult to construct a relatively thin diaphragm so that it will be 100% impervious. The diaphragm should be capable of holding air in the inner chamber for at least 24 hours with only a small loss of air therefrom.

The inner chamber 8 is inflated through a valve 15 attached to the rim and the outer chamber is inflated through a rubber valve 16 having an inflation slit 17 for the reception of an inflating needle connected to a suitable air supply. The material of this valve is under compression so as to insure that the slit 17 will normally remain closed to retain the air within the tire. This valve is more specifically described in the application of Sanderson et al. previously referred to. Other suitable means for inflating the chambers may be employed to inflate the chambers. When the outer chamber 9 becomes deflated, the outer wall of the omega-shaped diaphragm 10 rides on the inner wall of the tire tread adjacent thereto and the primary purpose of this invention is to apply a lubricated rubber to the outer surface of the diaphragm or alternatively to the inner surface of the tire to substantially eliminate the abrasive action between these surfaces.

When the outer chamber is deflated, most of the load is carried at the shoulders of the diaphragm and not directly at the center thereof if the tire and diaphragm are shaped as illustrated. It is, therefore, one purpose of the invention to apply more lubricant to the shoulders of the diaphragm than elsewhere and satisfactory results have been obtained by employing lubricated strips of rubber 18 only at the positions illustrated in Fig. 1. It may be desirable, however, to apply lubricated rubber or a lubricant to other surfaces such as the sides of the diaphragm or tire, so as to prevent chafing under normal operation or when the outer chamber fails. This can be accomplished by calendering thinner layers of rubber for these areas or the lubricant may be embodied in a self-curing rubber of any suitable well-known type which can then be spread over the desired surfaces in desired amounts. In the drawings the reference numerals 19 and 20 illustrate such a self-curing rubber embodying a lubricant, the rubber being suitably mixed with the lubricant before application.

The thickness of the rubber at 18 need preferably be only about .040" if a sufficient amount of lubricant is embodied in the rubber. The layers 19 and 20 need only be in the order of .003" to .005" in thickness. However, the quantity of lubricant employed depends largely upon the size or construction of the particular tire. For instance larger tires may require more lubricant. The embodiment illustrated is for an average passenger tire. With a lubricated rubber such as will be described more specifically hereinafter, satisfactory results will be obtained by using not more than .040" of rubber in the areas taking the maximum load. It will be noted that the lubricated rubber 18 is tapered off somewhat at the edges as illustrated in FIG. 1 due primarily to the flow of the rubber during the molding operation.

Whatever the type or the location of the lubricated rubber, the primary purpose of lubrication is the same, namely to prevent chafing of the rubber and thus prevent destruction of the diaphragm or tire and consequent failure thereof during use after the outer chamber fails.

As an example of a modification of the invention, reference is made to FIG. 3 of the drawings in which the lubricated rubber layers 21 correspond to 18 of FIG. 1, the main difference being that the heavier layers of lubricated rubber are applied to the inner tread surface of the tire layer rather than to the outer surface of the diaphragm. Layers 22 and 23 are made of self-curing rubber containing a lubricant and are similar to the material in layers 19 and 20 in FIG. 1. Generally speaking, in most cases lubricated rubber in the areas maintaining the greatest share of the load is all that is necessary, but it may be desirable to lubricate other portions of the surfaces of the tire and diaphragm, as illustrated at 22 and 23.

It will be noted that in FIGS. 2, and 3 and 4 the diaphragm is illustrated as a single layer cross-sectioned for rubber, but it is to be understood that this diaphragm includes at least two layers of rubberized cord fabric similar to FIG. 1 and in each case the cords have only limited stretch and will not expand to fill the tire casing upon deflation of the outer chamber as in the above-identified application of Sanderson et al.

In FIG. 4 I have illustrated a tire similar to that shown in FIG. 1, but in this case the diaphragm 10 has substantially the entire outer tread area thereof provided with a thickened layer of rubber 24 with auxiliary lubricated areas 25 and 26 of lesser thickness.

Obviously, other arrangements of the lubricated rubber may be employed without departing from the spirit or scope of the invention and the described forms of the invention are to be considered as merely illustrative of the manner in which this invention may be employed.

It will be understood also that a separate fluid lubricant such as disclosed in the aforesaid application of Sanderson et al. could be applied to lubricate the less important areas, but again this would have the disadvantages previously referred to.

One method of building a diaphragm of this character is illustrated in FIG. 7. A collapsible drum 27 similar to that employed in building tires is used to form a cylindrical body of rubberized fabric here illustrated as 28. The innermost layer may be calendered with a heavier layer of rubber to form the liner 14 or a liner may first be laid on the drum before application of the fabric layers. These layers are wrapped about the drum to form a sleeve with the end portions thereof extending beyond the ends of the drum. The channel portions 29 of the diaphragm are formed by wrapping the extending ends of the rubberized fabric about the forming rings 30. The lubricated rubber strips 31 (similar to 18 of FIG. 1) are then laid over the surface of the fabric as indicated in FIG. 7 and since these rubber strips and the rubberized fabric are naturally tacky no cement is necessary to adhere the strips to the tacky surface of the rubberized fabric.

As illustrated in FIG. 7 the lubricant-retaining rubber strips 31 are shown tapered at the edges. However, the usual way of making such strips is to cut them from a sheet of uniform thickness and apply them to the rubberized fabric layers. During the molding process the rubber flows and the edges of the strips become more or less tapered as illustrated in FIG. 1. After shaping the diaphragm by expanding the central portion thereof, the diaphragm is vulcanized in a mold with the rings 30 still in place and the vulcanization cures the rubber strips 31 to the fabric 28 in a manner well understood in the art. In the case of employing a self-vulcanizing rubbery material the diaphragm is first cured and then the lubricated rubber is spread over the desired areas and air curing causes the rubber to vulcanize. Such a material is very desirable at times when it becomes necessary to make a repair or to replace lubricated areas that may have become abraded during operation of the tire after deflation of the outer chamber especially when nails and the like penetrate the tire and engage the diaphragm. Such self-curing rubber materials are well known in the art, but applicant's invention resides in incorporating in such a self-curing rubber a lubricant of the type to be described more specifically hereinafter.

In FIGS. 5 and 6 I have illustrated a detail of the diaphragm illustrated in FIG. 1. In this latter figure as in all other figures, the diaphragm has two layers of rubberized fabric cords 34 and 35 arranged at angles in the order of 32° to the center line 36 of the tread of the diaphragm. The cords are preferably nylon cords having in the order of not over 10 to 20% residual stretch. The layer 14 of rubber is applied to the inner surface of the cord layers and the lubricated rubber as shown in these figures is applied to the areas designated in FIG. 1. The cords have their opposite ends extending into the extensions 11 (see FIG. 1) so that they are anchored between the beads and the rim by the pressure created by the air in the chambers.

Since the cords have a permissible stretch of from 10% to 20%, the inner chamber will increase in volume when the outer chamber is deflated. This reduces the pressure in the inner chamber temporarily but this pressure soon builds up again due to some heat build-up caused by the flexing of the sidewalls and the running of the diaphragm on the inner wall of the tire as is more particularly set forth in said application of Sanderson et al.

It will be noted that a removal of any portion of the lubricated rubber does not materially affect the imperviousness of the diaphragm because this imperviousness is accomplished primarily by the rubber in the rubberized fabric and the inner sealing layer of rubber 14.

Figure 8:
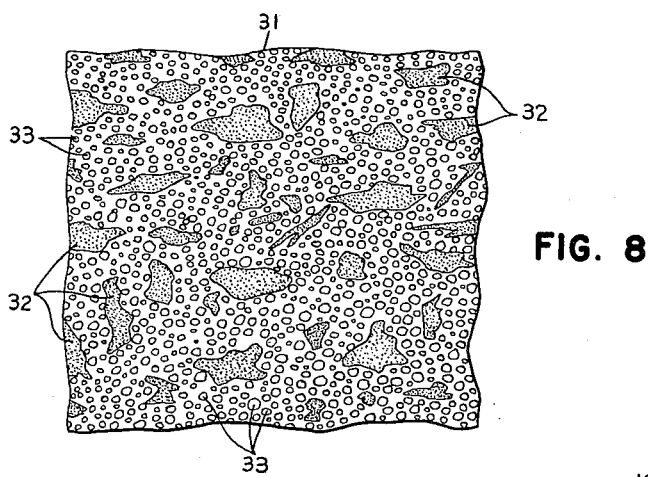
FIG. 8 is a magnified view of the surface of a lubricated rubber compounded according ot the teachings of this invention.

FIG. 8 illustrates the surface of the lubricated rubber greatly magnified. The irregular areas 32 are graphite crystals showing the relatively flat broad areas presented, and the areas 33 indicate the liquid lubricant retained physically in very small openings in the rubber. When the outer chamber of the tire becomes flat and the load is taken by the inner chamber, the compression of the rubbery material causes the fluid lubricant to be forced out of the rubber to increase the lubricating properties. It is possible to use either of the aforementioned lubricants singly or in combination, but it is preferred that the two be used in combination.

Of course, the amount of lubricant to be employed in the lubricated rubber will be determined by the nature of the lubricant and the amount that the rubber may hold physically without destroying the usefulness of the physical structure of the rubber to hold the lubricant in place or reduce its useful tackiness. Thus, if one were to use an extremely high percentage of graphite, say 95%, and mix it with 5% of rubber, the material would probably not hold together very well. It has been found that by using a solid lubricant such as graphite, amounts up to 40% by weight can be used successfully with the balance being rubber, or if a liquid lubricant is used it has been found that an amount as high as 5½% by weight may be used successfully. If a combination of a solid and a liquid lubricant is used, then these percentages may have to be reduced to some extent. The critical point involved here is the ability of the rubber to hold the desired amounts of the lubricant. There must be sufficient rubber to bond the materials together and hold them together during the building of the diaphragm and after vulcanization. It should also be understood in this connection that the amount of lubricant used should not be great enough to materially destroy the tackiness of the rubber as it is preferable that the rubber surface remain tacky to permit easy application to the diaphragm or other surface prior to vulcanization, so as to eliminate the need of cements and the like during the building operation.

The liquid lubricant may ooze out of the rubber during normal operation of the tire, but this is of no real consequence because centrifugal force will throw this lubricant against the inner surface of the tire to a position where it would serve its purpose in case of deflation of the outer chamber. As a practical matter, most of the lubricant will be retained within the rubber and, if the rubber abrades at all, fresh areas of the lubricant are brought into operation.

The particular nature of the solid and liquid lubricants is very important for the purposes of this invention. The solid lubricants should preferably be those which have relatively flat cleavage planes such as graphite, mica and molybdenum-disulphide. Such lubricants are desirable because after being mixed with the rubber, the flat surfaces are more or less arranged parallel to the surface of the rubber during the calendering, tubing and molding operation because of the pressure exerted on the rubber during these operations. The flat surfaces are, therefore, in proper position to give maximum lubrication. Graphite is relatively cheap, is available in large quantities for this purpose and has been selected as a preferable solid lubricant. While graphite is a carbon compound similar to the carbon that is used in the rubber itself, its physical structure is different because it has flat cleavage planes, whereas ordinary carbon is amorphous and in itself is not a good lubricant.

The liquid lubricant should be incompatible with rubber and of a type not readily dissolved into the physical structure of the rubber. It should also be a stable compound which will not break down during normal or emergency operating conditions. Some of the following are suggested as suitable liquid lubricants for use with a rubbery material for the purposes of this invention.

Silicone oils of the class to be described hereinafter more fully are preferable because they have a high degree of permanence without drying out or cracking and, furthermore, they are not injurious to the rubber. The silicone oils when released from the rubber will spread rather uniformly and rapidly over the rubber surface. Such oils also have high heat resistance, due primarily to its relatively inert character, and they have a very low coefficient of friction.

Silicone oils are linear polymers of the type represented by the general formula:

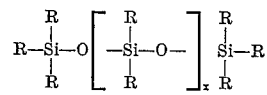

in which R is an organic radical of relatively low molecular weight such as methyl or ethyl. These oils are clear liquids which can be obtained in a wide range of viscosities as determined by the length of the polymer chain. The silicone oils have viscosities ranging from 40 to 1,000 centistokes measured at 100° F. and are marketed by General Electric, Dow-Corning and Linde Air Products.

Other lubricating materials that may be used are glycerine, castor oil, olive oil, transformer oil, and similar non-drying triolein oils or a chlorinated bi-phenyl such as the Arochlors made by Monsanto Chemical Co.

These liquid lubricants are heat stable and, therefore, do not break down readily into other compounds having little if any lubricating qualities.

Since heat resistance and abrasion resistance are possessed, to a greater or less degree, by all types of rubber both natural and synthetic, it is possible to use in the lubricating layer natural rubber, synthetic natural rubber, reclaimed rubber, the rubbery copolymers of butadiene and styrene, known as GR–S, the oil-extended copolymers of butadiene and styrene, the rubbery copolymers of butadiene and acrylonitrile, known as GR–A, the rubbery polymers and copolymers of 2-chlorobutadiene-1,3, known as neoprene, or the rubbery copolymers of a major proportion of an iso-olefin such as isobutylene and a minor proportion of a conjugated di-olefin such as butadiene-1,3, these copolymers being known as butyl rubber. It may be desirable to use blends of two or more of these rubbers which are adhesively and physically compatible with one another to get optimum heat and abrasion resistance. Butyl rubber is one of the more preferred types of rubber for use in fabricating the lubricating layer although since its adhesion to other rubbers such as natural rubber and GR-S is not adequate unless an adhesive is used, butyl rubber should preferably be used only when butyl rubber is also used in the other rubber portions of the shield as otherwise there may be adhesion problems.

Two rubbers which give excellent results are natural rubber and GR-S. It has been observed that optimum results are obtained by using mixtures of GR-S with natural rubber in the range of from 25 parts to 40 parts of GR-S by weight with from 75 to 60 parts natural rubber by weight. These blends have been observed to provide very satisfactory operating results, since they are not subject to the tendency of an all-GR-S compound to become brittle after extended operation of a punctured tire, nor to the observed tendency of an all-natural rubber compound to become sticky under extended operating conditions.

An example of a specific formulation which has proven to be particularly effective in producing the desired functional characteristics in the lubricating layer is shown below. Parts are shown by weight.

| | Parts |
|---|---|
| Natural rubber | 70 |
| GR-S (75/25 copolymer of butadiene/styrene) | 30 |
| Graphite | 60 |
| Castor oil | 10 |
| Paraffin wax | 2 |
| Anti-oxidant (polymerized tri-methyl dihydroquinone) | 2 |
| Mercaptobenzothiazyl disulfide | 1 |
| Mercaptobenzothiazole | 1 |
| Sulfur | 0.75 |

The amount and types of waxes, antioxidants, accelerators, and curing agents employed in the compounding of the lubricating strips may be varied from the amounts indicated in the formulation given above, depending upon the particular rubber employed and the service conditions to which the lubricating layer will be exposed. While in the above formula the specific synthetic rubber employed is a 75/25 copolymer of butadiene and styrene, it should be understood that other rubbery copolymers containing, for instance, as little as 10% or as much as 40% styrene by weight may be employed.

In regard to the amount of lubricant, whether solid, liquid or mixtures thereof, it should be evident that the exact amount employed will depend upon the amount of lubrication desired and the particular rubber with which the lubricants are to be used, it being desirable that only sufficient lubricant be present to provide the desired lubricating surface on the rubber employed, without reducing the tackiness beyond a point such that it will not adhere satisfactorily to other elements of the diaphragm or tire.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A device of the class described comprising an annular rim provided with bead mounting seats, an annular open-bellied tubeless tire having beads at the edges thereof mounted on said seats to form with the rim an annular air compartment, an annular flexible substantially air impervious diaphragm constructed of materials to limit expansion thereof to an outer circumference substantially less than that of the outer circumference of the inner wall of the tire, said diaphragm spanning the space between the opposed inner walls of the tire and having the lateral edges thereof releasably sealed to the walls of said compartment adjacent the tire beads and rim bead seats, the diaphragm thus dividing the annular compartment formed by the tire and rim into an inner rim adjacent chamber and an outer tire adjacent chamber having a common substantially impervious wall therebetween formed by said diaphragm, and means for inflating each of said chambers, said diaphragm being outwardly arched sufficiently that the outermost portion thereof extends materially beyond the outer surface of the rim but is spaced materially from the inner tread surface of the tire whereby, under normal operation with both chambers inflated, the diaphragm will not engage said inner tread surface, and yet will hold the tread surface of the tire substantially spaced from the rim when the outer chamber is deflated to thus prevent any substantial collapse of the sidewalls of the tire, one of the opposed surfaces of said diaphragm and inner tread surface comprising rubber having a lubricant of a type incompatible with the rubber physically embedded therein at the outer surface thereof to provide a continuously renewable lubricated surface.

2. A device as set forth in claim 1 in which the lubricant is a solid lubricant.

3. A device as set forth in claim 1 in which the lubricant is a solid crystalline substance of the class including graphite, mica and molybdenum-disulphide.

4. A device as set forth in claim 1 in which the lubricant is a liquid.

5. A device as set forth in claim 1 in which the lubricant is a liquid of the class including silicone oils, glycerine, castor oil, transformer oils, non-drying triolein oils and chlorinated bi-phenyl.

6. A device as set forth in claim 1 in which the lubricant includes a solid lubricant and a liquid lubricant.

7. A device as set forth in claim 1 in which the lubricant is graphite and castor oil.

8. A device as set forth in claim 1 in which the lubricated rubber is arranged only on selected circumferentially extending areas of the diaphragm.

9. A device as set forth in claim 1 in which the lubricated rubber is arranged only on selected circumferentially extending areas of the inner tread surface.

10. A device as set forth in claim 1 in which the lubricated rubber is arranged in two spaced circumferentially extending areas, one at each of the lateral edges of the diaphragm at the tread portion thereof.

11. A device as set forth in claim 1 in which the lubricated rubber is arranged in two spaced circumferentially extending areas on the inner tread surface of the tire, one opposed to each of the lateral edges of the diaphragm at the tread portion thereof.

12. A device as set forth in claim 1 in which the lubricated layer of rubber comprises a self-vulcanizing rubber applied in the uncured state to the desired surface.

13. A device as set forth in claim 1 in which a portion of said surface is formed of a heat vulcanizable rubber applied before vulcanization and other portions are formed of a self-vulcanizable rubber applied in the unvulcanized state.

14. For use in a tubeless tire and rim combination in which an open-bellied tire having beaded edges is mounted on a rim to form therewith an annular air-receiving container, a substantially air-impervious diaphragm adapted to be mounted within said container to span the space between the axially spaced inner walls thereof to thus divide the container into inner and outer air chambers, said diaphragm having a normal outer diameter of a size whereby under normal inflation it extends radially outwardly of the rim but is in spaced relation to the inner tread surface of the tire and is constructed to prevent substantial loss of air from the inner chamber when the outer chamber becomes deflated, the said diaphragm having an outer layer of rubber on at least portions of the outer circumferential surfaces thereof, and a lubricant of a type incompatible with the rubber physically embedded in the outer surface thereof.

15. A diaphragm as set forth in claim 14 in which the diaphragm is made of rubber reinforced with fabric to prevent substantial stretching thereof when the outer chamber is deflated and in which the rubber immediately adjacent said fabric is free of a lubricant.

16. A diaphragm as set forth in claim 14 in which the lubricant is an oil comprising in the order of not more than 5% by weight of said layer.

17. A diaphragm as set forth in claim 14 in which the lubricant is graphite comprising in the order of not more than 40% by weight of said layer.

18. A diaphragm as set forth in claim 14 in which the diaphragm has lateral extensions at the edge thereof adapted to be removably arranged between the beaded edges of the tire and the rim in a position with respect thereto to be held between the tire and rim under the inflation pressures within said chambers.

References Cited in the file of this patent

UNITED STATES PATENTS

| | | |
|---|---|---|
| 837,458 | Fairchild | Dec. 4, 1906 |
| 1,519,268 | Schnell | Dec. 16, 1924 |
| 1,564,397 | Armstrong | Dec. 8, 1925 |
| 2,045,341 | Bourdon | June 23, 1936 |
| 2,702,286 | Iknayan | Feb. 15, 1955 |

OTHER REFERENCES

Two Chamber Safety Tire, from Goodyear, Tires and T.B.A. Merchandising, June 1956, page 47.

The Reduction of the Gas Permeability of Natural Rubber by the Use of Fillers, by P. Thirion et al., an article in Revue General Du Caoutchouc, vol. 28, No. 10, 1951, pages 684–691. An English analysis of the French article appears on pages 725 and 726 of the magazine.